United States Patent
Lee

(10) Patent No.: US 8,170,616 B2
(45) Date of Patent: May 1, 2012

(54) OPERATION METHOD AND APPARATUS OF MOBILE COMMUNICATION TERMINAL SUPPORTING DUAL MODE

(75) Inventor: Sang-Hyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 12/480,270

(22) Filed: Jun. 8, 2009

(65) Prior Publication Data

US 2009/0312020 A1    Dec. 17, 2009

(30) Foreign Application Priority Data

Jun. 17, 2008  (KR) .................. 10-2008-0056725

(51) Int. Cl.
*H04B 1/38* (2006.01)

(52) U.S. Cl. .................. 455/558; 455/552.1; 455/557; 455/550.1

(58) Field of Classification Search ............... 455/435.2, 455/558, 450, 411, 408, 433, 550, 404.2, 455/432.1, 422.1, 458, 436, 434, 456.1, 415, 455/41.2, 552.1, 67.11, 550.1, 63.1, 557, 455/556.2; 370/328, 331, 342, 335
See application file for complete search history.

(56) References Cited

U.S. PATENT DOCUMENTS

| | | | |
|---|---|---|---|
| 7,392,034 B2* | 6/2008 | Westman et al. ............. 455/402 |
| 2002/0137545 A1* | 9/2002 | Nachef ........................ 455/558 |
| 2004/0109431 A1* | 6/2004 | Abrahamson et al. ........ 370/342 |
| 2004/0253952 A1* | 12/2004 | Rager et al. ................ 455/432.1 |
| 2005/0176466 A1* | 8/2005 | Verloop et al. ................ 455/558 |
| 2007/0041360 A1* | 2/2007 | Gallagher et al. ............ 370/352 |
| 2009/0046655 A1* | 2/2009 | Zhao et al. .................... 370/331 |
| 2009/0061932 A1* | 3/2009 | Nagarajan .................... 455/558 |
| 2009/0227230 A1* | 9/2009 | Camilleri et al. ............. 455/408 |
| 2009/0239583 A1* | 9/2009 | Jheng ........................... 455/558 |
| 2009/0239584 A1* | 9/2009 | Jheng et al. .................. 455/558 |
| 2009/0270072 A1* | 10/2009 | Hsu et al. ...................... 455/411 |
| 2009/0270130 A1* | 10/2009 | Lee et al. ...................... 455/558 |
| 2009/0298459 A1* | 12/2009 | Saini et al. ................. 455/404.1 |
| 2009/0312020 A1* | 12/2009 | Lee ............................. 455/435.2 |
| 2010/0279698 A1* | 11/2010 | Wong ............................ 455/450 |
| 2011/0086609 A1* | 4/2011 | Buehler et al. ............. 455/404.2 |

FOREIGN PATENT DOCUMENTS

KR  10-2005-0052967 A  7/2005

* cited by examiner

*Primary Examiner* — Tan Trinh

(74) *Attorney, Agent, or Firm* — Jefferson IP Law, LLP

(57) ABSTRACT

An operation method and apparatus of a mobile communication terminal supporting a dual mode are provided. The method includes determining if two Subscriber Identification Module (SIM) cards are inserted, searching for and registering with a cell of a first network supported by a first SIM card, and searching for and registering with a cell of a second network supported by a second SIM card during a non-paging duration of the first network.

20 Claims, 3 Drawing Sheets

OPERATION METHOD AND APPARATUS OF MOBILE COMMUNICATION TERMINAL SUPPORTING DUAL MODE

PRIORITY

This application claims the benefit under 35 U.S.C. §119 (a) of a Korean patent application filed in the Korean Intellectual Property Office on Jun. 17, 2009 and assigned Serial No. 10-2008-0056725, the entire disclosure of which is hereby incorporated by reference.

BACKGROUND OF THE INVENTION

1. Field of the Invention

The present invention relates to an operation method and apparatus of a mobile communication terminal supporting a dual mode. More particularly, the present invention relates to an operation method and apparatus of a mobile communication terminal supporting two Subscriber Identification Module (SIM) cards by one chip.

2. Description of the Related Art

In recent years, as communication technology has advanced, network systems employing a variety of communication schemes are being provided. Depending on a service area, either a plurality of network systems are supported or only one network system is supported. Also, each network system incorporates a different service charge system depending on the service provider. For example, in the case of Russia, there is a large difference in charges depending on an area and an associated network. Accordingly, in the conventional art, a technique for selectively providing a desired network service according to a user's preference by inserting two Subscriber Identification Module (SIM) cards in one mobile communication terminal and supporting two kinds of networks is provided. In order to support the inserted two SIM cards, the mobile communication terminal uses two main chips as if two terminals are assembled in one case.

However, if the mobile communication terminal supports two SIM cards using two main chips as described above, there is a disadvantage in that separate hardware is also required to support each SIM card so that a size of the mobile communication terminal increases. Furthermore, the separate hardware increases the total cost of the mobile communication terminal.

SUMMARY OF THE INVENTION

An aspect of the present invention is to address at least the above mentioned problems and/or disadvantages and to provide at least the advantages described below. Accordingly, an aspect of the present invention is to provide an operation method and apparatus of a mobile communication terminal supporting a dual mode.

Another aspect of the present invention is to provide an operation method and apparatus of a mobile communication terminal supporting two Subscriber Identification Module (SIM) cards by one chip.

In accordance with an aspect of the present invention, an operation method of a mobile communication terminal supporting a dual mode is provided. The method includes determining if two Subscriber Identification Module (SIM) cards are inserted, searching for and registering with a cell of a first network supported by a first SIM card, and searching for and registering with a cell of a second network supported by a second SIM card during a non-paging duration of the first network.

In accordance with another aspect of the present invention, an apparatus of a mobile communication terminal supporting a dual mode is provided. The apparatus includes two Subscriber Identification Module (SIM) cards comprising user information, and a controller. The controller controls a function of determining if the two SIM cards are inserted, searching for and registering with a cell of a first network supported by a first SIM card, and searching for and registering with a cell of a second network supported by a second SIM card during a non-paging duration of the first network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An operation method and apparatus of a mobile communication terminal supporting two Subscriber Identification Module (SIM) cards by one chip according to an exemplary embodiment of the present invention are described below. The SIM card denotes a chip or other means for storing authorization information for using a mobile phone, for using features of the mobile phone and/or service provider such as a roaming service, and for storing various data such as a subscriber's personal information. By inserting the SIM card into the mobile communication terminal, a user may use the mobile communication terminal with his/her own phone number anywhere irrespective of a mobile phone technology specification.

Figure 1:
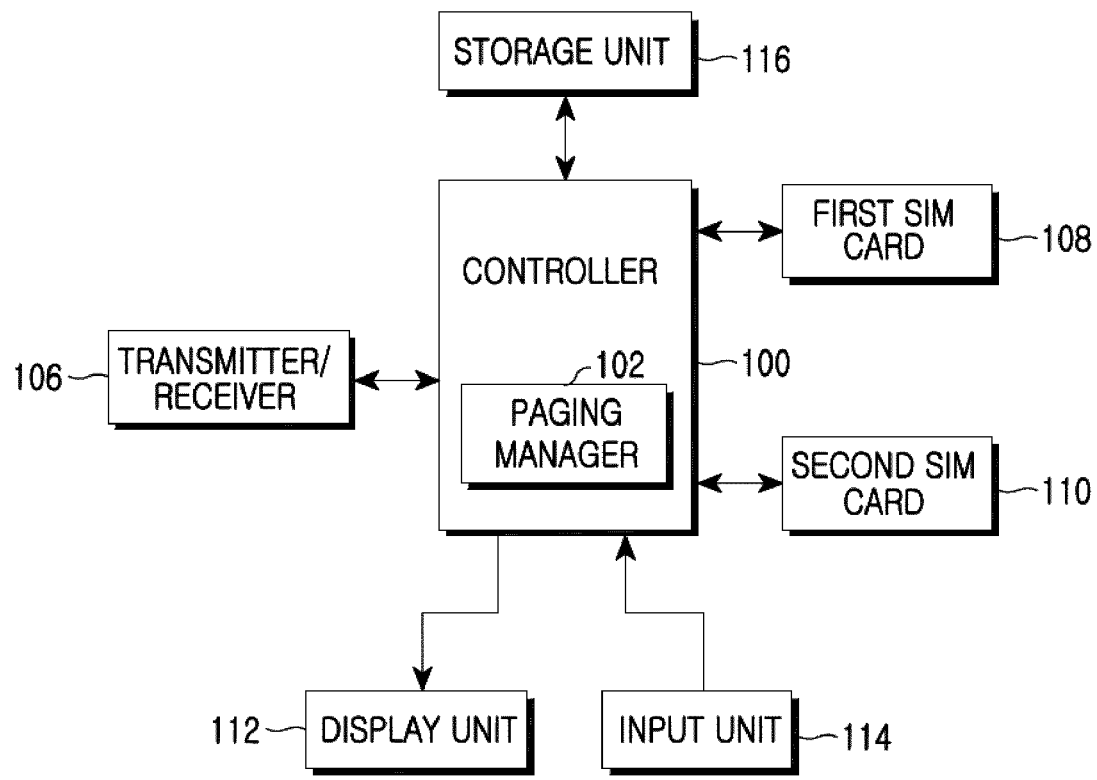
FIG. 1 is a block diagram illustrating a construction of a mobile communication terminal according to an exemplary embodiment of the present invention.

FIG. 1 is a block diagram illustrating a construction of a mobile communication terminal according to an exemplary embodiment of the present invention.

Referring to FIG. 1, the mobile communication terminal includes a controller (i.e., a Micro-Processor Unit (MPU)) 100, a transmitter/receiver 106, a first Subscriber Identification Module (SIM) card 108, a second SIM card 110, a display unit 112, an input unit 114, and a storage unit 116. The controller 100 includes a paging manager 102.

The controller 100 controls an operation of the mobile communication terminal. For example, the controller 100 performs a process and control for voice telephony and data communication and, in addition to a general function, processes a function for supporting two SIM cards by one chip according to an exemplary embodiment of the present invention.

The controller 100 identifies a SIM card determined as a master card between the first SIM card 108 and second SIM card 110, and determines a network system to operate as a master and a network system to operate as a slave. The controller 100 controls an operation for performing a scanning and registration process for the master network and the slave network. After performing the scanning and registration process for the master network and camping on the registered network, the controller 100 performs a process such that the scanning and registration process for the slave network is implemented during a non-paging duration of the master network.

Also, the controller 100 generates and manages a cell list for the master network and slave network. Here, the cell list may include sets of cells that are arranged in four steps such as a serving cell, a near cell, a far cell, and a neighbor cell. The serving cell denotes a cell of the master network that a Mobile Station (MS) camps on, the near cell and far cell are generated and managed based on a bar list of the master network, and the slave cells are allocated to the near cell and far cell such as multi band near cell management. In an exemplary implementation, at the time of initially constructing the bar list, the near cell and far cell are determined based on receive signal strength and, when receive signal strengths are the same, are constructed in an Absolute Radio Frequency Channel Number (ARFCN) sequence. Here, the ARFCN is a channel number used to identify a Radio Frequency (RF) channel.

At the time of the cell list generation, the controller 100 determines the near cell, far cell, and neighbor cell on the basis of a receive signal power magnitude of each cell comprised in a bar list of two networks. Here, as a receive signal power magnitude of each cell varies, cells determined to be the near cell and far cell may be changed with each other or cells determined to be the far cell and neighbor cell may be changed with each other. For example, when a receive signal power magnitude of an 'A' cell, determined to be a far cell, is greater than a receive power magnitude of a 'B' cell, determined to be a near cell, a change may be made such that the 'A' cell is designated as the near cell and the 'B' cell is designated as the far cell.

In an exemplary implementation, the controller 100, using the paging manager 102, determines paging queue execution or non-execution for two networks on the basis of a paging period acquired during a registration process with the master network and slave network and manages its operation. Here, a paging queue represents determining if uplink/downlink data for a corresponding network is generated. That is, the paging manager 102 controls the transmitter/receiver 106 to perform a paging queue for the master network during a paging duration of the master network and perform a paging queue for the slave network during a paging duration of the slave network. In an exemplary embodiment, the paging manager 102 controls the transmitter/receiver 106 to perform only the paging queue for the master network in a portion where the paging durations of the master network and slave network are overlapped.

Under control of the controller 100, the transmitter/receiver 106 performs a function for transmitting/receiving a signal to/from a corresponding network during the paging duration of both the master network and the slave network. Also, under control of the controller 100, the transmitter/receiver 106 performs a master network registration process using information that is recorded in a SIM card determined as the master card between the first and second SIM cards 108 and 110, and performs a slave network registration process using information that is recorded in a SIM card not determined as the master card during a non-paging duration of the master network.

The first and second SIM cards 108 and 110 may each be inserted and removed from the mobile communication terminal, have their own micro processors and memory chips, and store a variety of user information and supported network information.

The display unit 112 displays status information, numbers, letters, moving pictures and still pictures generated during an operation of the mobile communication terminal. The input unit 114 includes a plurality of function keys and provides key input data corresponding to a key pressed by a user to the controller 100. In an exemplary implementation, under control of the controller 100, the display unit 112 displays a screen requesting to determine the master card from between the first and second SIM cards 108 and 110. The input unit 114 receives data representing whether to set either one of the first and second SIM cards 108 and 110 as a master card from a user and provides the received data to the controller 100.

The storage unit 116 stores a microcode of a program for processing and controlling the controller 100 and a variety of kinds of reference data, and stores temporary data generated during execution of a variety of kinds of programs and a diversity of kinds of updateable depository data. In an exemplary implementation, the storage unit 116 stores a cell list generated and changed under control of the controller 100.

Figure 2:
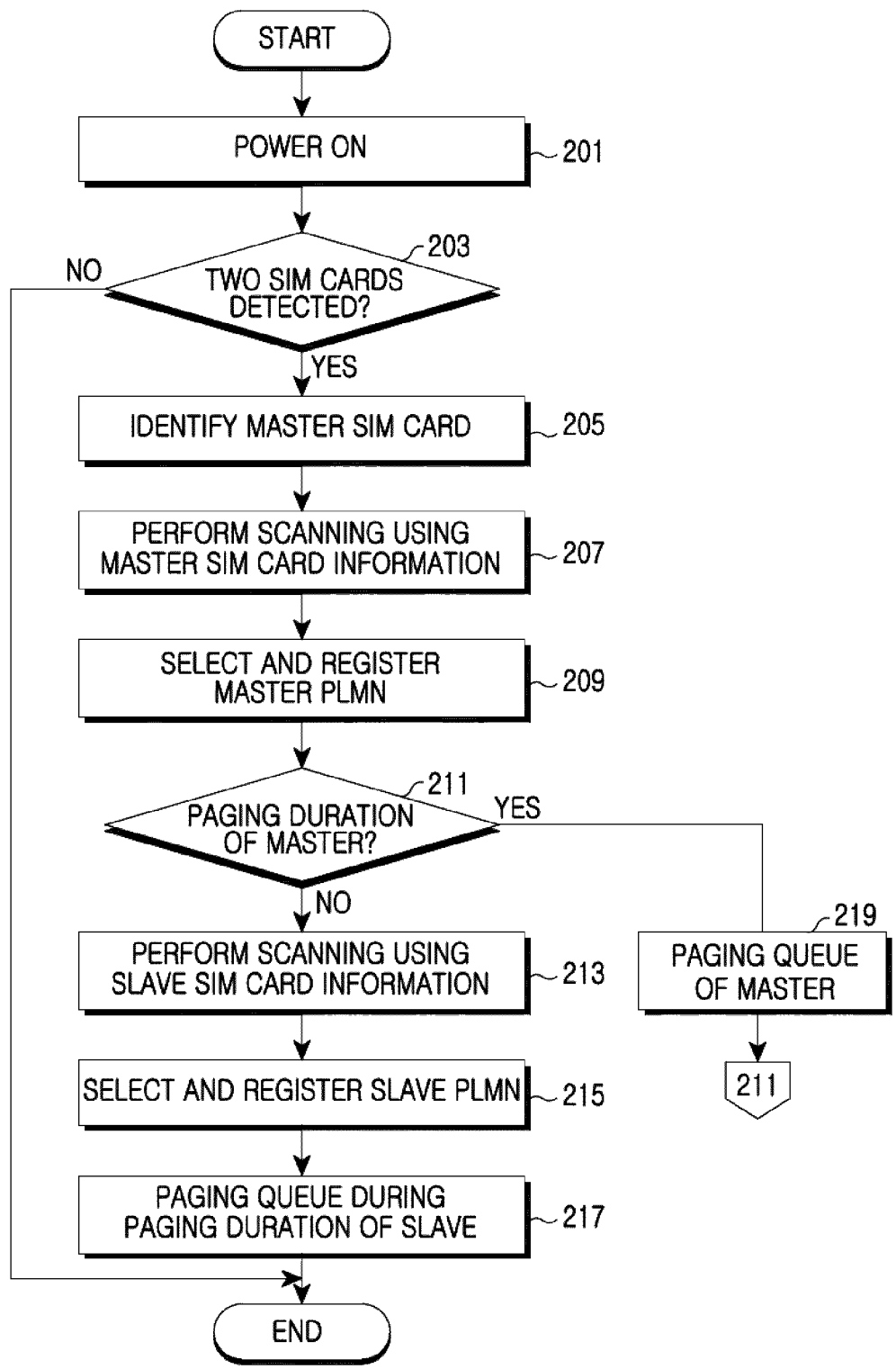
FIG. 2 is a flowchart illustrating an operation procedure in a mobile communication terminal according to an exemplary embodiment of the present invention.

FIG. 2 is a flowchart illustrating an operation procedure in a mobile communication terminal according to an exemplary embodiment of the present invention.

Referring to FIG. 2, if the mobile communication terminal is powered on in step 201, the mobile communication terminal proceeds to step 203 and determines if two SIM cards are inserted. If the two SIM cards are not inserted, the mobile communication terminal terminates the process according to an exemplary embodiment of the present invention.

On the other hand, if it is determined that two SIM cards are inserted, in step 205, the mobile communication terminal identifies a SIM card determined as a master SIM card between the two inserted SIM cards. In an exemplary implementation, the master SIM card may be determined by a user.

In another exemplary implementation, the master SIM card may be arbitrarily determined.

In step 207, the mobile communication terminal performs scanning for a corresponding network using information recorded in the SIM card determined as the master SIM card. In step 209, the mobile communication terminal performs a Public Land Mobile Network (PLMN) cell selection and registration process on the basis of the scanning result, thus camping on a specific cell of a network supported by the master SIM card.

In step 211, the mobile communication terminal determines if the present time corresponds to a paging duration of the master network. When the present time corresponds to the paging duration, the mobile communication terminal proceeds to step 219 and performs a paging queue for the master network. Following step 219, the mobile communication terminal returns to step 211 and performs a subsequent step.

On the other hand, when it is determined in step 211 that the present time does not correspond to the paging duration, the mobile communication terminal proceeds to step 213 and performs a scanning operation for a corresponding network using information that is recorded in the other SIM card not determined as the master SIM card, i.e., a SIM card determined as a slave SIM card from between the two SIM cards. In step 215, the mobile communication terminal performs a PLMN cell selection and registration process on the basis of the scanning result. In step 217, the mobile communication terminal performs a paging queue during a paging duration of the slave network. At this time, when the paging duration of the slave network is substantially the same as the paging duration of the master network, the mobile communication terminal does not perform the paging queue of the slave network and performs the paging queue of the master network.

Then, the mobile communication terminal terminates the process according to an exemplary embodiment of the present invention.

Exemplary paging queue operations of the master network and slave network are described below in more detail.

Figure 3:
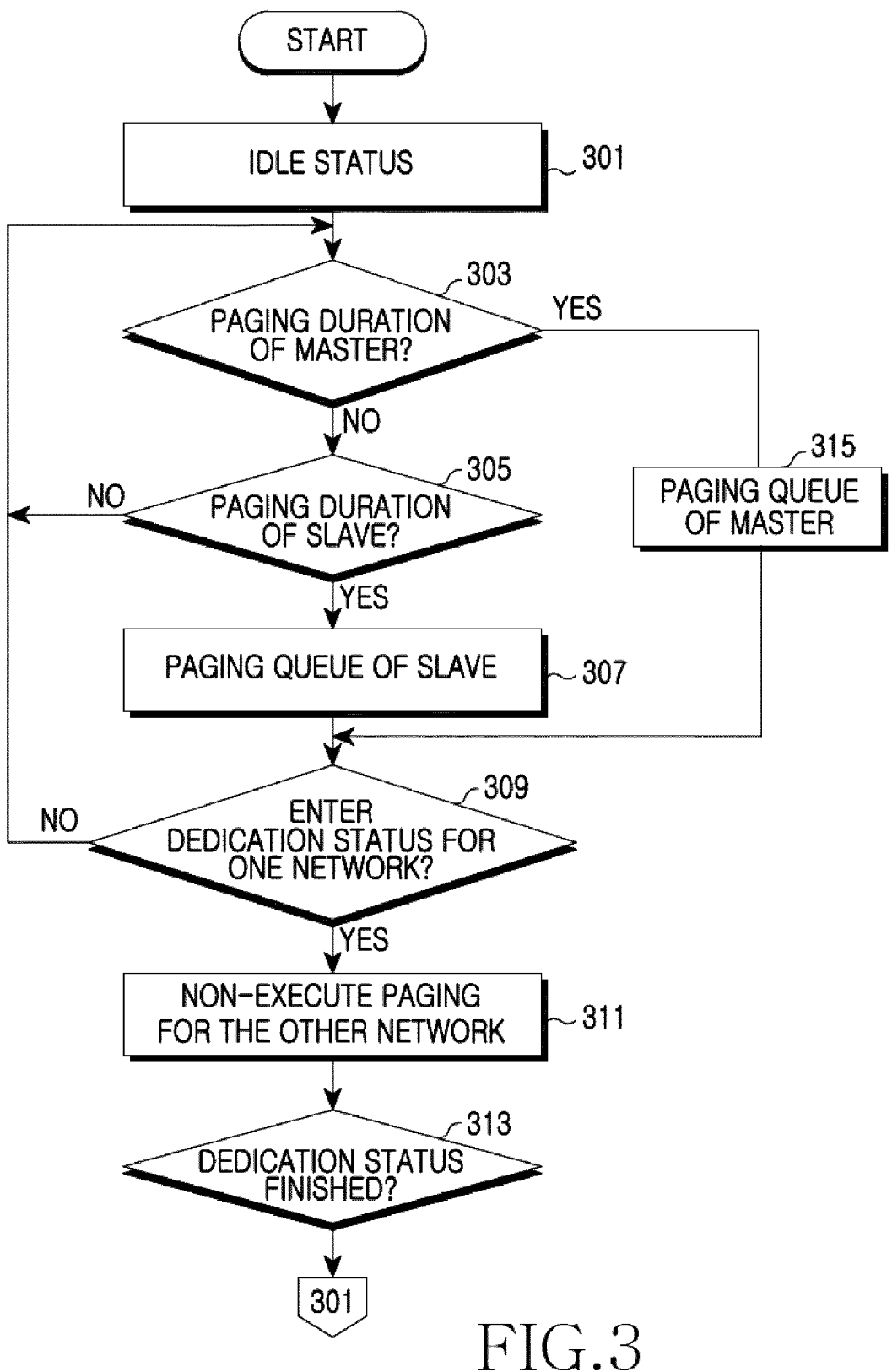
FIG. 3 is a flowchart illustrating an operation procedure of an idle and dedication status in a mobile communication terminal according to an exemplary embodiment of the present invention.

FIG. 3 is a flowchart illustrating a procedure of operating a paging queue in a mobile communication terminal according to an exemplary embodiment of the present invention.

Referring to FIG. 3, when the mobile communication terminal enters an idle status in step 301, it proceeds to step 303 and determines if the present time corresponds to a paging duration of a master network. If the present time does correspond to the paging duration of the master network, in step 315, the mobile communication terminal performs a paging queue for the master network and then proceeds to step 309.

On the other hand, if the present time does not correspond to the paging duration of the master network, in step 305, the mobile communication terminal determines if the present time corresponds to a paging duration of a slave network. If the present time does not correspond to the paging duration of the slave network, the mobile communication terminal returns to step 303 and performs a subsequent step. On the other hand, if the present time does correspond to the paging duration of the slave network, the mobile communication terminal proceeds to step 307 and performs a paging queue for the slave network.

In step 309, the mobile communication terminal determines if it enters a dedication status for either the master network or the slave network as the paging queue result. Here, the dedication status represents a status for generating uplink/downlink data for a network and transmitting/receiving the data with the network.

When not entering the dedication status for either network, the mobile communication terminal returns to step 303 and performs a subsequent step. On the other hand, when entering the dedication status for either network, the mobile communication terminal proceeds to step 311 and controls not to perform a paging queue although it is a paging duration for the other network during the dedication status.

In step 313, the mobile communication terminal determines if the dedication status is finished. If it is determined in step 313 that the dedication status is finished, the mobile communication terminal returns to step 301, entering an idle status and performs a subsequent step.

In the aforementioned description, if a call for a slave network is generated but execution of a paging queue for the slave network fails because of a paging queue execution for a master network, a call forwarding service may be provided in a network.

Exemplary embodiments of the present invention have an effect of, by providing an operation method and apparatus of a mobile communication terminal supporting two SIM cards by one chip, reducing a hardware size while reducing cost consumption caused by a hardware part, thus being capable of lowering a production cost.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a mobile communication terminal supporting a dual mode, the method comprising:
   determining if two Subscriber Identification Module (SIM) cards are inserted;
   searching for and registering with a cell of a first network supported by a first SIM card; and
   searching for and registering with a cell of a second network supported by a second SIM card during a non-paging duration of the first network.

2. The method of claim 1, wherein the searching for and registering with the cell of the first network and the searching for and registering with the cell of the second network are each performed using a chip consisting of one transmission/reception module.

3. The method of claim 1, wherein, if a paging duration of the first network and a paging duration of the second network overlap with each other, a paging queue of the first network is performed and a paging queue of the second network is not performed during a duration of the overlap.

4. The method of claim 1, further comprising:
   when it is a paging duration of the first network, performing a paging queue for the first network;
   when it is a non-paging duration of the first network while being a paging duration of the second network, performing a paging queue for the second network; and
   when uplink/downlink data for one of the first network and the second network is generated as a result of the respective paging queue for the first and second network, while transmitting/receiving the generated uplink/downlink data, not performing a paging queue for the other network.

5. The method of claim 1, further comprising:
   generating a neighbor cell list for a respective serving cell of each of the first and second networks on the basis of a frequency number; and
   generating and managing a whole cell list distinguished as a cell set of four steps on the basis of receive signal power magnitudes of respective cells included in the respective neighbor cell lists of the first and second networks.

6. The method of claim 5, wherein the respective cells included in the cell set of the four steps are changeable into a different cell set depending on a receive signal power magnitude.

7. The method of claim 6, wherein the respective cells included in the cell set of the four steps each comprise one of serving cell, a near cell, a far cell, and a neighbor cell.

8. The method of claim 7, wherein the near cell and far cell are determined based on receive signal strength and, when receive signal strengths are the same, are determined using an Absolute Radio Frequency Channel Number (ARFCN) sequence.

9. The method of claim 1, wherein the first SIM card comprises a card determined as a master SIM card by a user.

10. The method of claim 1, wherein the first SIM card comprises a card determined as a master SIM card as a default.

11. An apparatus of a mobile communication terminal supporting a dual mode, the apparatus comprising:
   two Subscriber Identification Module (SIM) cards comprising user information; and
   a controller for determining if the two SIM cards are inserted, for searching for and registering with a cell of a first network supported by a first SIM card, and for searching for and registering with a cell of a second network supported by a second SIM card during a non-paging duration of the first network.

12. The apparatus of claim 11, consisting of one transmitter/receiver for the performing of the cell search and registration for the first network and second network under control of the controller.

13. The apparatus of claim 11, wherein if a paging duration of the first network and a paging duration of the second network overlap with each other, the controller performs a paging queue of the first network and does not perform a paging queue of the second network during a duration of the overlap.

14. The apparatus of claim 11, wherein, when uplink/downlink data for one of the first network and the second network is generated as a result of a respective paging queue for one of the first network and second network, the controller does not perform a paging queue for the other network while transmitting/receiving the generated uplink/downlink data.

15. The apparatus of claim 11, wherein, on the basis of a frequency number, the controller generates a neighbor cell list for a respective serving cell of each of the first and second networks and, on the basis of receive signal power magnitudes of respective cells included in the respective neighbor cell list, generates and manages a whole cell list distinguished as a cell set of four steps.

16. The apparatus of claim 15, wherein the controller changes each cell set depending on receive signal power magnitudes of the respective cells included in the cell set of the four steps.

17. The apparatus of claim 16, wherein the respective cells included in the cell set of the four steps each comprise one of serving cell, a near cell, a far cell, and a neighbor cell.

18. The apparatus of claim 17, wherein the near cell and far cell are determined based on receive signal strength and, when receive signal strengths are the same, are determined using an Absolute Radio Frequency Channel Number (ARFCN) sequence.

19. The apparatus of claim 11, wherein the first SIM card comprises a card determined as a master SIM card by a user.

20. The method of claim 11, wherein the first SIM card comprises a card determined as a master SIM card as a default.

* * * * *